United States Patent [19]
Nam

[11] Patent Number: 5,528,760
[45] Date of Patent: Jun. 18, 1996

[54] DATA TRANSMISSION/RECEIVE SYSTEM AND CONTROL METHOD USING DUMMY DATA TO SIGNIFY TRANSMISSION/RECEPTION STATE AND TO DETECT TRANSMISSION ERROR

[75] Inventor: Dong Y. Nam, Seoul, Rep. of Korea

[73] Assignee: Samsung Electronics Co., Ltd., Suwon, Rep. of Korea

[21] Appl. No.: 829,871

[22] Filed: Jan. 31, 1992

[30] Foreign Application Priority Data

Jan. 31, 1991 [KR] Rep. of Korea .......... 91-1693

[51] Int. Cl.⁶ .......... G06F 11/00; G06F 13/00; G06F 13/42
[52] U.S. Cl. .......... 395/200.14; 395/185.09; 364/DIG. 1; 364/266.3; 364/266.4; 364/DIG. 2; 364/943.9; 364/944.8; 364/944.91
[58] Field of Search .......... 395/200.13, 200.14, 395/200.17, 200.19, 849, 850, 851, 185.01, 185.05, 185.09; 364/266.3, 266.4, 943.9, 944.8, 944.91

[56] References Cited

U.S. PATENT DOCUMENTS

| | | | |
|---|---|---|---|
| 3,731,278 | 5/1973 | Eldridge et al. | 395/275 |
| 3,753,228 | 8/1973 | Nickolas et al. | 371/47.1 |
| 4,658,353 | 4/1987 | Whittaker et al. | 395/200.06 |
| 4,686,690 | 8/1987 | Sato | 371/47.1 |
| 4,689,740 | 8/1987 | Moelands et al. | 395/550 |
| 4,910,754 | 3/1990 | Allen et al. | 375/108 |
| 5,095,425 | 3/1992 | Hese | 395/550 |
| 5,263,170 | 11/1993 | Kato | 395/800 |

FOREIGN PATENT DOCUMENTS

| | | |
|---|---|---|
| 59-63751 | 4/1984 | Japan. |
| 59-165047 | 11/1984 | Japan. |

OTHER PUBLICATIONS

Ray Kersey, "Synchronous data link control", Basics of Data Communiations, Harry Karp editor, McGraw-Hill Pub. Co., 1976, pp. 201–210.

Primary Examiner—Thomas C. Lee
Assistant Examiner—D. Dinh
Attorney, Agent, or Firm—Burns, Doane, Swecker & Mathis

[57] ABSTRACT

An invertor room air-conditioner for transmitting/receiving data between indoor and outdoor microprocessors, in which one microprocessor is synchronized with the remaining microprocessor using its internal clock pulse, while the microprocessors perform the data transmission/reception using dummy data previously stored therein, respectively, thereby removing the data transmission/reception errors and the influence of the exterior noises.

7 Claims, 8 Drawing Sheets

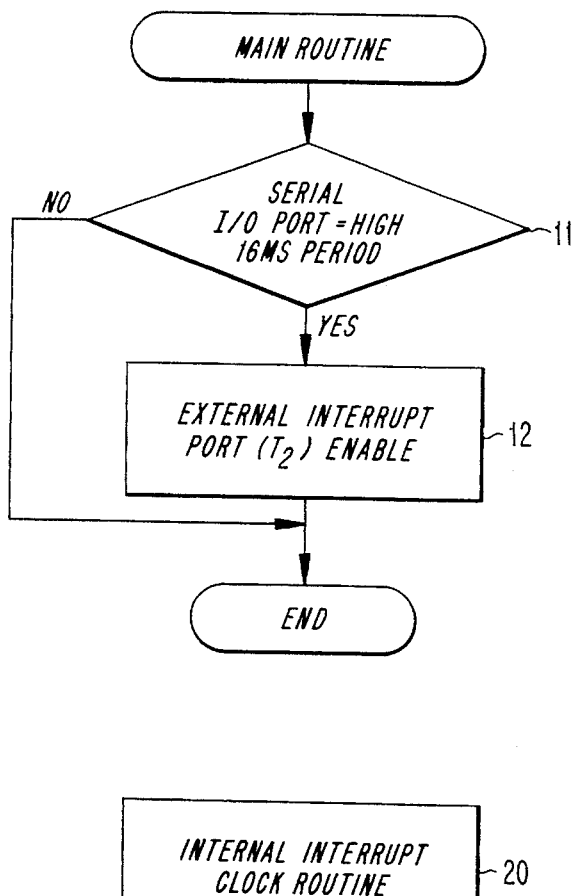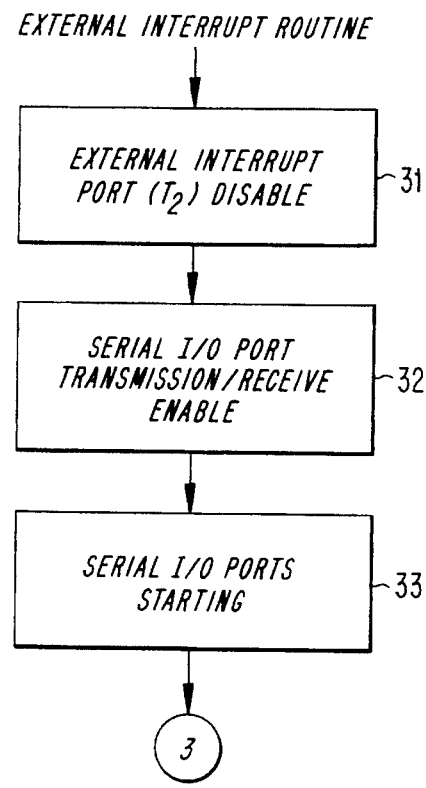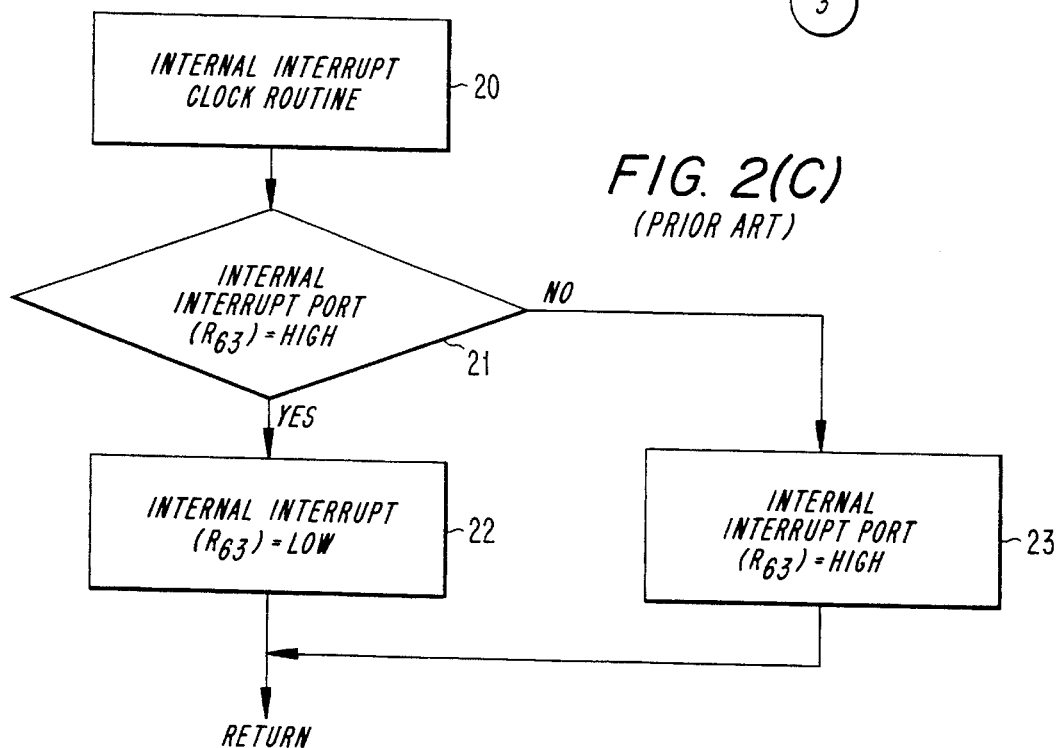

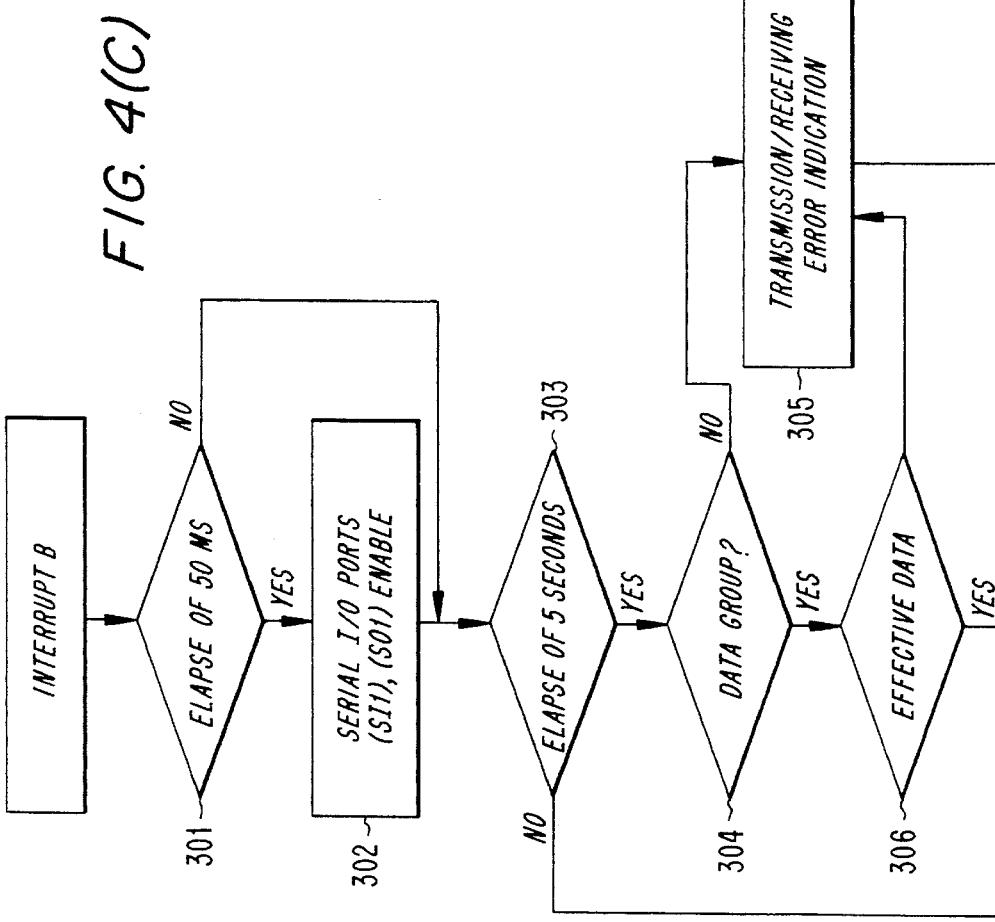
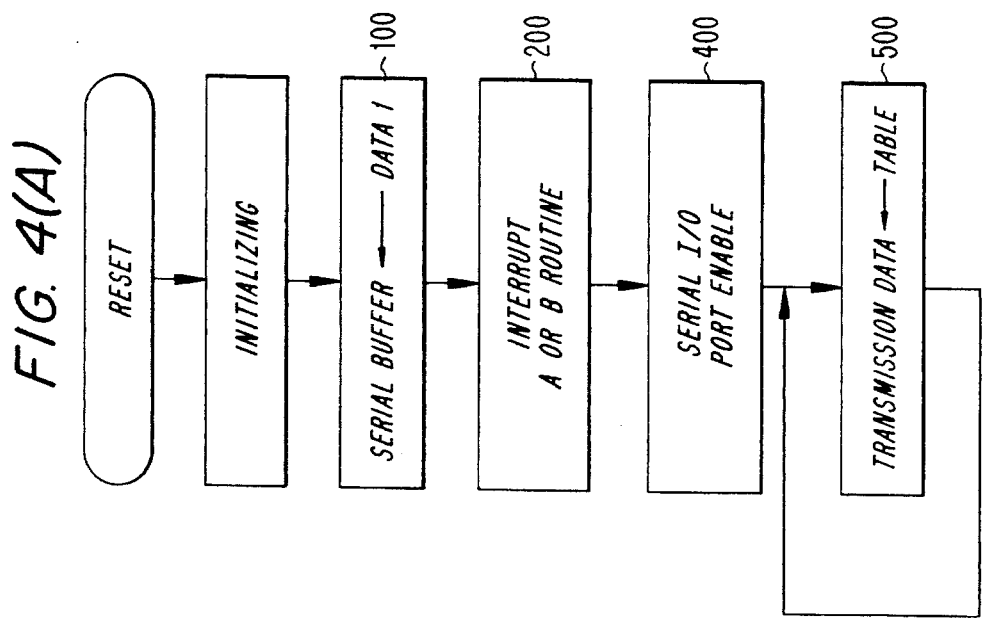

DATA TRANSMISSION/RECEIVE SYSTEM AND CONTROL METHOD USING DUMMY DATA TO SIGNIFY TRANSMISSION/RECEPTION STATE AND TO DETECT TRANSMISSION ERROR

BACKGROUND

This invention is related to providing a system and control method therefor for transmitting/receiving data between microprocessors, and particularly to providing a system and control method therefor for performing data transmission/receive between indoor and outdoor microprocessors of an invertor room air-conditioner using the internal synchronizing clocks from the indoor microprocessor and dummy data previously stored in the microprocessors.

Data transmission/receive between microprocessors are generally dependent upon their interface input/output integrated circuit.

For example, Japanese Laid-Open Utility Model Publication No. 84-165047 relates to a synchronizing circuit of a signal processing device comprising a terminal for outputting a signal representing the interrupt ending state from a micro-computer which has the longest internal interrupt processing time among a plurality of micro-computers, and a gate circuit for prohibiting the supply of the interrupt signal when the terminal outputs the signal representing the interrupt ending state to supply it to micro-computers except for its own micro-computer. It is known that this circuit is related to the using of an external interrupt signal.

Also, Japanese Laid-Open Utility Model Publication No. 84-63751 concerns an interface circuit including a first switching element being enabled by data from a second micro-computer when the first micro-computer is at the data receiving condition, to reverse the data from the second micro-computer thereby to supply data to the first micro-computer, and a second switching element being enabled by data from the first micro-computer when the first micro-computer is at the data output condition, to reverse data from the first micro-computer thereby to feed data to the second micro-processor, thereby transmitting and receiving bilateral data between the first and the second micro-computers.

Also, a system for transmitting and receiving data between indoor and outdoor microprocessors is disclosed in an invertor room air-conditioner as shown in FIG. 1.

An indoor microprocessor 1 is provided with data input/output ports SI1 and SO1 connected to a data interface circuit, a synchronizing clock output port SCK1, an internal interrupt port R63 and an external interrupt port T2. The data output port SO1 is connected through a power source resistor R6 to a PNP type transistor TR1. The transistor TR1 is coupled at its emitter through a power source resistor R1, a diode D1 and a resistor R7 to the light emitting diode of a photo-coupler PC1, while being coupled through a resistor R2 to the transistor emitter of a photo-coupler PC2 grounded. The data input port SI1 is connected to the output terminal of a comparator COMP1 to receive the output signal therefrom, while the output signal is applied to the external interrupt port T2. The comparator COMP1 is tapped at its non-inverting terminal (+) by a resistor R3 between the transistor TR1 and the resistor R2, and the inverting terminal (−) is connected through a resistor R5 to a power source BDD. On the other hand, the collector of the transistor TR1 is connected through a resistor R4 to the inverting terminal (−) of the comparator COMP1, while being connected in common to the diode anode of the photo-couplers PC1 and PC3 and the transistor emitter of the photo-coupler PC2 to be grounded. The synchronizing clock port SCK1 is connected through a diode D5 and a resistor R8 to the diode of the photo-coupler PC3. The common line of the collector of the transistor TR1, the transistor emitter of the photo-couplers PC1 and PC2 and the diode of photo-coupler PC3 is grounded. Electrolysis condensers C2 and C3 and a diode D2 are coupled in parallel therebetween to separate the common line from the emitter signal line of the transistor TR1, while a diode D3 and a condenser C4 are coupled in parallel therebetween to separate it from the synchronizing clock port SCK1.

An outdoor microprocessor 2 includes data input/output ports SI2 and S)2 connected to a data interface circuit and a synchronizing clock input port SCK2. The data output port SO2 is coupled through a resistor R13 to the base of a transistor TR2. The transistor TR2 is connected at its emitter to the transistor of the photo-coupler PC1, through a resistor R9 to the input port SI2, at its collector through a resistor R10 to the diode of the photo-coupler PC1, and then through the resistor R1 to the transistor emitter of the photo-coupler PC3. The photo-coupler PC3 is connected at its transistor emitter to the synchronizing clock port SCK2 and at its transistor collector to the power source VDD. Herein, the resistor R11 is grounded, and a resistor R12 and a condenser C5 are connected in parallel to teach other between the input line and the grounded line, so that the data input port SI2 is separated from the grounded line.

Such an invertor room air-conditioner performs an internal timer interrupt routine as follows, referring to FIGS. 2(A)–2(D).

An indoor microprocessor 1 checks the internal interrupt clock state at step 21 and outputs a high level signal, if the clock signal is low, or a low level signal at its interrupt port R63 to the synchronizing clock ports SCK1 and SCK2 of indoor and outdoor microprocessors 1 and 2, if the clock signal is high, through steps 22 and 23. For example, the signal from the internal interrupt port R63 is directly applied to the synchronizing clock port SCK1 and through the diode D5 and the resistor R8 to drive the diode of the photo-coupler PC3, so that the transistor of the photo-coupler PC3 is turned on to permit the synchronizing clock port SCK2 to receive the synchronizing clock pulses from the indoor microprocessor 1. At this time, the data transmission/receive state is set between the microprocessors 1 and 2 to perform the data transmission/receive main routine (shown in FIG. 2(A)).

With respect to the indoor microprocessor 1, at step 11 it is determined whether the pulse input from the serial output port SO2 to the serial input port SI1 is a high level pulse having a 16 ms period. If it is a high level having a 16 ms period, control passes to step 12 to enable the external interrupt port T2. Otherwise, control is returned to the previous state operation.

When the external interrupt port T2 is once enabled, an external interrupt routine is performed as shown in FIG. 2B. At step 31, the external interrupt port T2 is disabled, at step 32 the serial input/output ports SI1 and SO2 are enabled and at step 33 the microprocessor 1 is in the data transmission/receive state. In other words, when the output from the serial output SO1 is a high level signal to turn off the transistor TR1, the data signals from the serial output port SO2 are applied through the transistor TR2 to turn on/off the photo-coupler PC2, and then through the resistors R2 and R3 to feed the data signals to the comparator COMP1, so that the comparator COMP1 output its compared signals to the serial input port SI1.

On the contrary, when the serial output port SO2 outputs a high level signal to turn off the transistor TR2, the data signals from the serial output port SO1 are passed through the resistor R2, the diode D1 and the resistor R6 to turn on/off the photo-coupler PC1. At this time, the data signals are input to the serial input port SI2. Therefore, between the indoor and outdoor microprocessors 1 and 2, the data transmission/receive state is established.

Thereafter, as represented in FIG. 2D, at step 40 it is determined whether the receive mode is set at any one of the microprocessors 1 and 2. If in the receiving mode, control proceeds to step 41 to judge whether the third byte is received. If it is received, control passes to step 42 to disable the receiving mode and to enable the transmission mode. Then, at step 43, the first byte of transmission data is output to start the transmission mode at step 50.

If the receiving mode is not established at step 40, control jumps to step 44 to determine whether the third byte is transmitted. If not transmitted, control passes to step 45 to determine whether the second byte is transmitted. If the second byte is not transmitted, control passes to step 46 to output the second byte transmission data so as to start the transmission mode at step 50, and return, and if the second byte is transmitted, control passes to step 47 to output the third byte transmission data so as to start the transmission mode and return.

Furthermore, if the third byte is transmitted at step 44, control jumps to step 48 to disable the transmission mode and to prohibit the serial input/output ports at step 49. With it, the microprocessors 1 and 2 can transmit/receive data through their serial input/output ports SI1, SI2 and SO1 and SO2.

As described above, the prior art commonly uses an external interrupt, which causes delays by the priority order processing during the processing of a plurality of interrupt signals in addition to the bit delay due to the clock synchronizing delay phenomena, which increases the possibility of making errors in the data transmission/receive.

Also, with respect to the hardware, the external interrupt is used to determine the initial synchronizing starting point of a system, however, this can lead to the external interrupt ports being initialized by exterior noises, thereby making system errors.

The prior art explained with reference to FIG. 1 must be provided with an external interrupt port for synchronizing any one of the indoor and outdoor microprocessors and an internal interrupt port mounted on any one of the microprocessors to generate the synchronizing clock for all the microprocessors. The data transmission/receive between microprocessors requires a plurality of interrupts with respect to its software in a manner that one microprocessor should transmit the high level signal of a 16 ms period to another microprocessor.

The object of the present invention is to provide a system and control method thereof for transmitting and receiving data between microprocessors without using an external interrupt.

Another object of the present invention is to provide a system and control method thereof for transmitting and receiving data using an internal clock of one of the microprocessors as a synchronizing clock signal between microprocessors.

Still another object of the present invention is to provide a system and control method thereof for transmitting and receiving data using dummy data previously input in indoor and outdoor microprocessors to prevent the noise errors during the reception of data by each of the microprocessors.

SUMMARY OF THE INVENTION

According to the present invention, a system for data transmission and reception comprises a first microprocessor for generating synchronizing clock signals from its inner timer and means for judging whether the received data group correspondeds to the most significant bit during the data receiving mode according to transmitting dummy data previously stored therein and means for determining the matter to the existence of an effective bit if the received data is corresponded to the most significant bit more than once at the judging means.

A control method for data transmission and reception between microprocessors comprising the steps of: operating the inner timer of any of the microprocessors to generate synchronizing clock signals therefrom, forcing any one of the microprocessors to output its dummy data in order to be operated in the receiving mode, judging whether the received data group corresponds to a most significant byte at the receiving mode, and determining whether the received data is corresponded to the most significant bit more than once.

Therefore, the present invention can use inner clock signals from one microprocessor as synchronizing clock signals for data transmission and reception between at least two microprocessors and dummy data for determining any one of the transmission and receiving modes, thereby preventing the transmission/receive errors due to the exterior noises.

BRIEF DESCRIPTION OF THE DRAWINGS

The present invention will be explained in detail below with reference to the accompanying drawings; in which:

FIGS. 2A, 2B, 2C and 2D are flow charts illustrating the operation of a conventional system for transmitting and receiving data between microprocessors;

FIGS. 4A, 4B and 4C are flow charts illustrating the data transmission and reception of an indoor microprocessor according to the present invention;

DETAILED DESCRIPTION OF THE INVENTION

Figure 1:
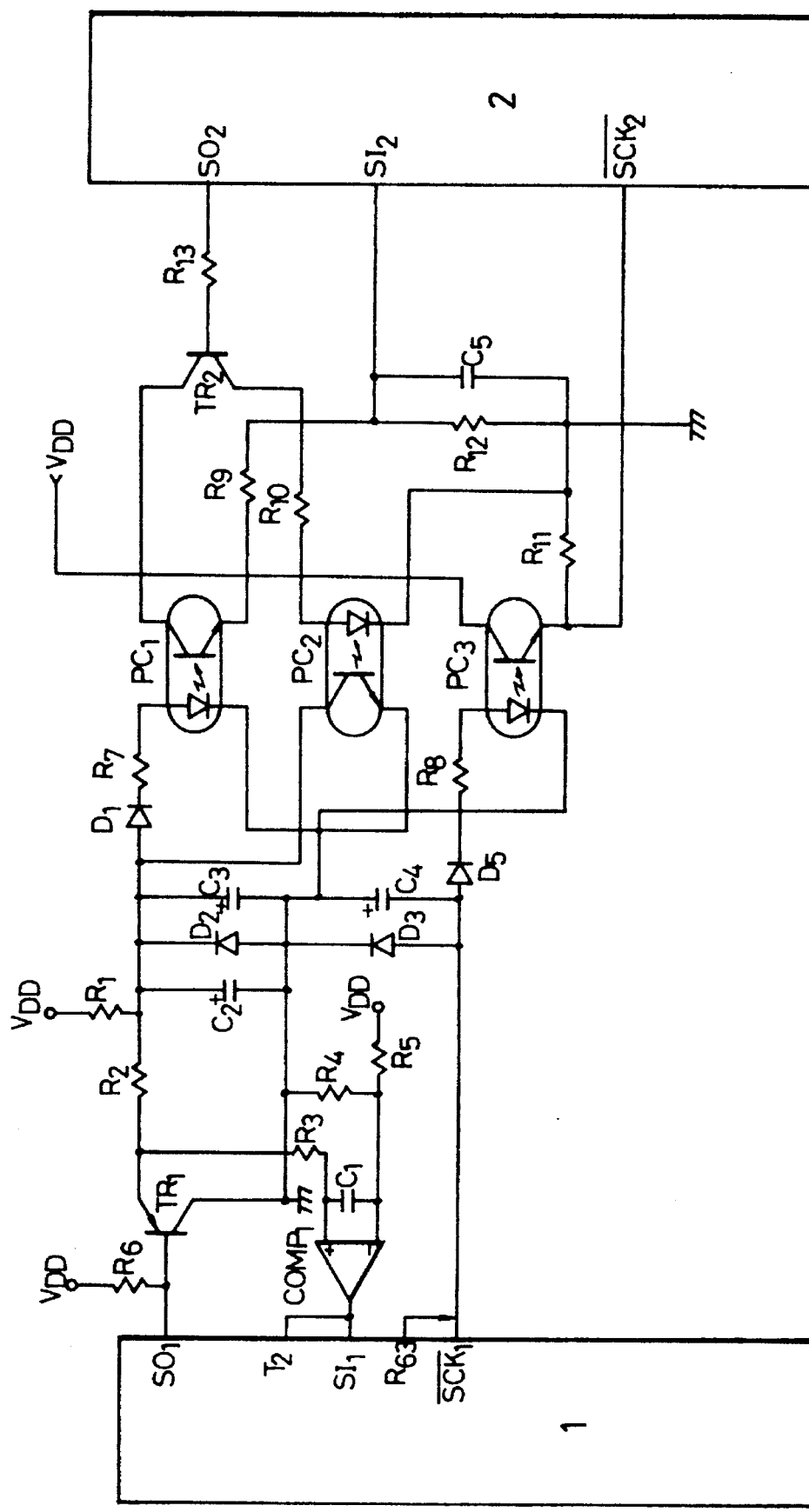
FIG. 1 is a circuit showing a conventional system for transmitting and receiving data between microprocessors.
Figure 2D:
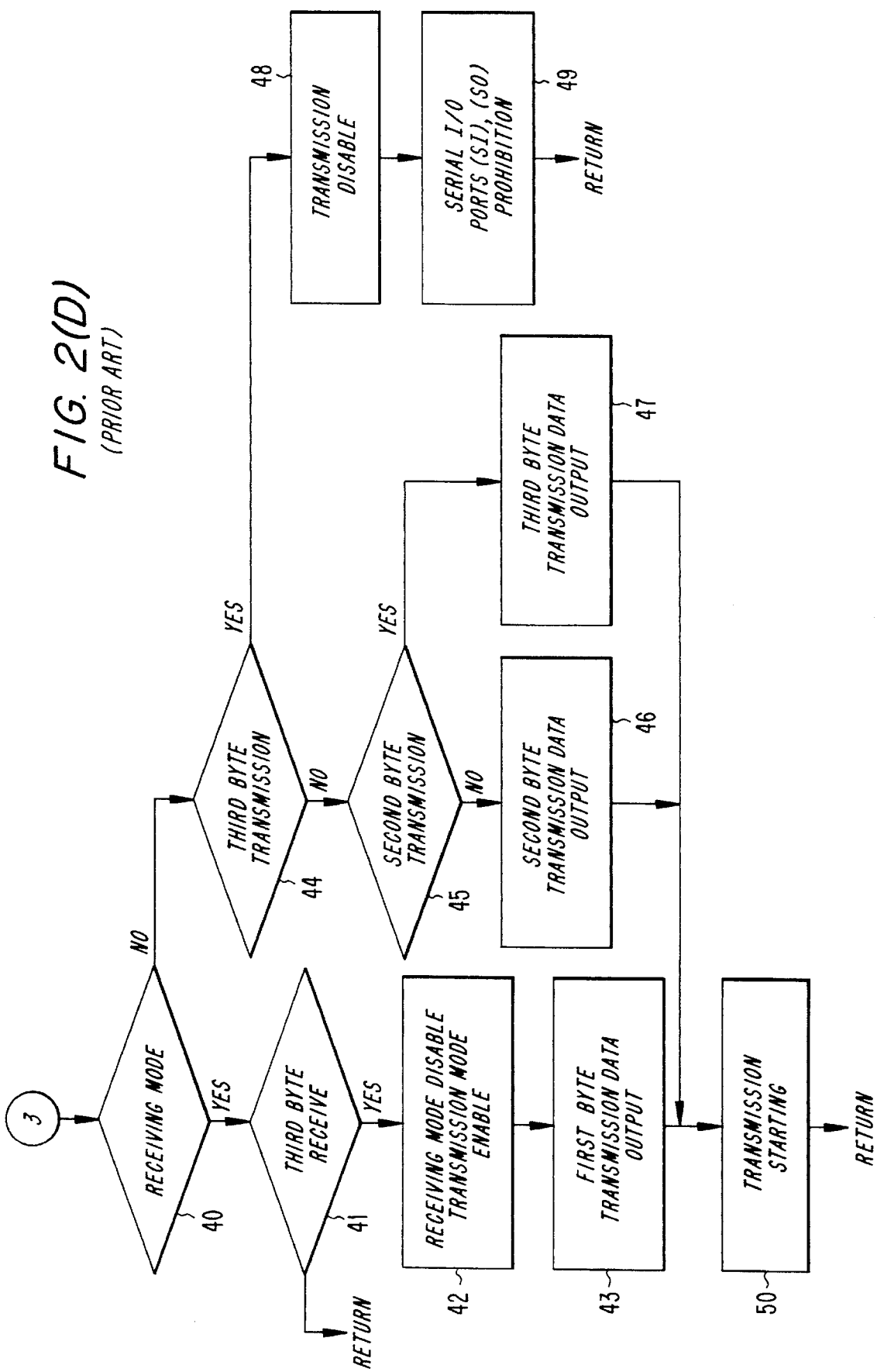
Figure 3:
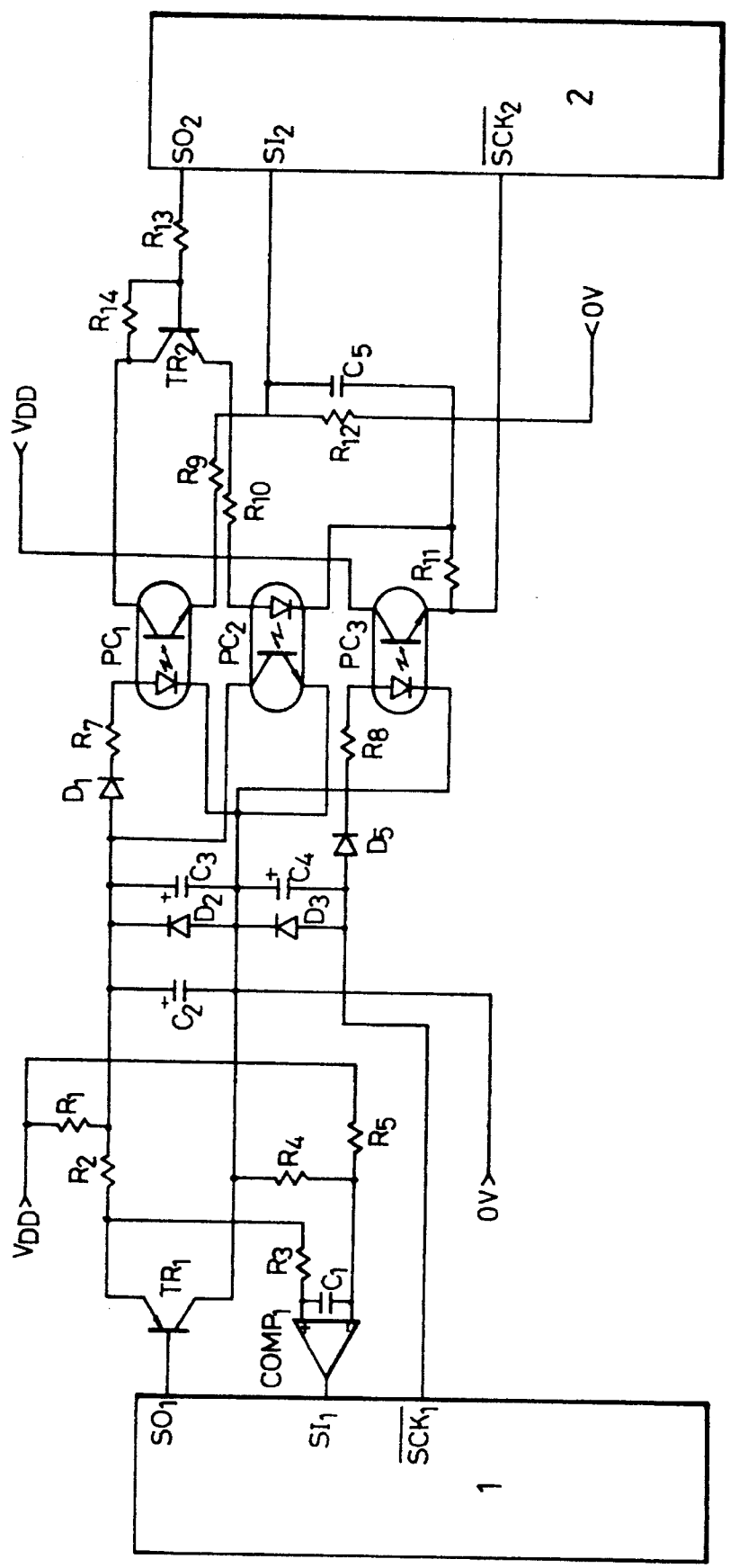
FIG. 3 is a circuit showing a system for transmitting and receiving data between microprocessors according to the present invention.

FIG. 3 is a circuit showing a system for transmitting and receiving data between indoor and outdoor microprocessors adapted to an invertor room air-conditioner according to the present invention. This configuration is almost the same as that of FIG. 1, and the same elements as those of FIG. 1 have identical reference numbers, of which detailed description here is omitted for brevity. However, the configuration differs between FIG. 1 and FIG. 3 in that a microprocessor 1 is not provided with an external interrupt port T2 or an internal interrupt port R63. Thus, the operation of an interface is basically the same as that of FIG. 1, but the technical concept of data transmission and reception between microprocessors 1 and 2 is different from that of FIG. 1.

Specifically, a microprocessor 1 applies its internal clock signals from a synchronizing clock port SCK1 through a diode D5 and a resistor R8 to the diode of a photo-coupler PC3. The photo-coupler PC3 is turned on/off at the clock intervals to apply its clock pulse signals to the synchronizing clock port SCK2 of a microprocessor 2, so that the microprocessor 2 is synchronized with the microprocessor 1. At this time, the microprocessors 1 and 2 are ready for transmitting and receiving data therebetween.

To enter the receiving mode, the indoor microprocessor 1 transmits previously stored dummy data (OFFH) through serial output port SO1, and the outdoor microprocessor 2 transmits previously stored dummy data (OFFH) through serial output port S02. Then, the transistors TR1 and TR2 connected to each of the serial output ports SO1 and S02 are selectively turned off. If dummy data is output from the serial output prot S02 of the microprocessor 2 then the transmitting data from the indoor microprocessor 1 is input through the photo-coupler PC1 to the serial input port Si2 of the microprocessor 2. On the contrary, if dummy data from the serial output port SO1 of the indoor microprocessor is output, the outdoor transmitting data is applied through a photo-coupler PC2, resistors R2 and R3 and a comparator COMP1 to the serial input port SI1 of the indoor microprocessor 1 in order to transmit/receive data therebetween. These data transmission and reception procedures will now be described in detail as follows.

Figure 4B:
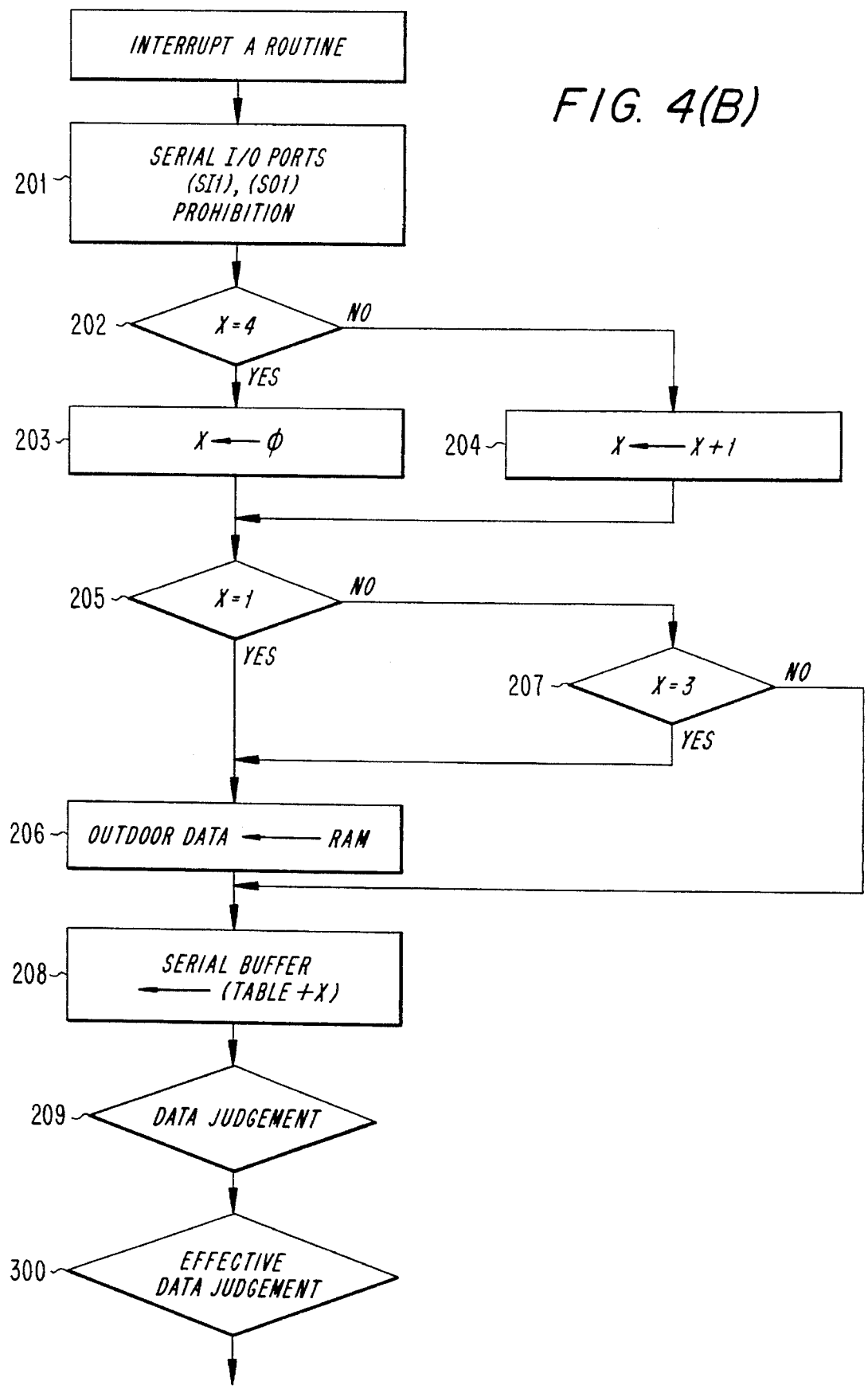
Figure 5:
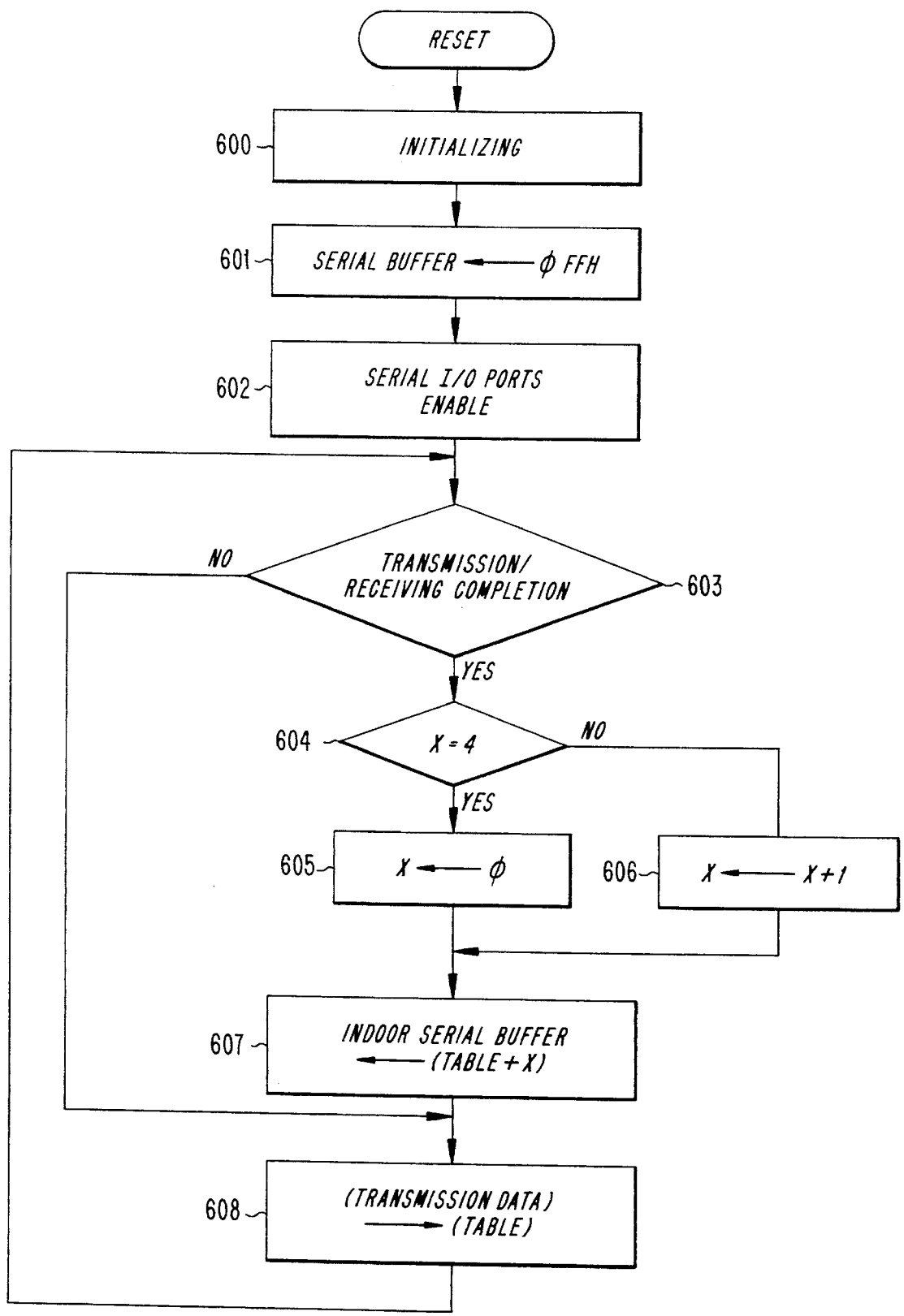
FIG. 5 is a flow chart illustrating the data transmission and reception of an outdoor microprocessor according to the present invention; and, FIG. 6 is a block diagram illustrating the procedures of the data transmission and reception between microprocessors according to the present invention.
Figure 6:
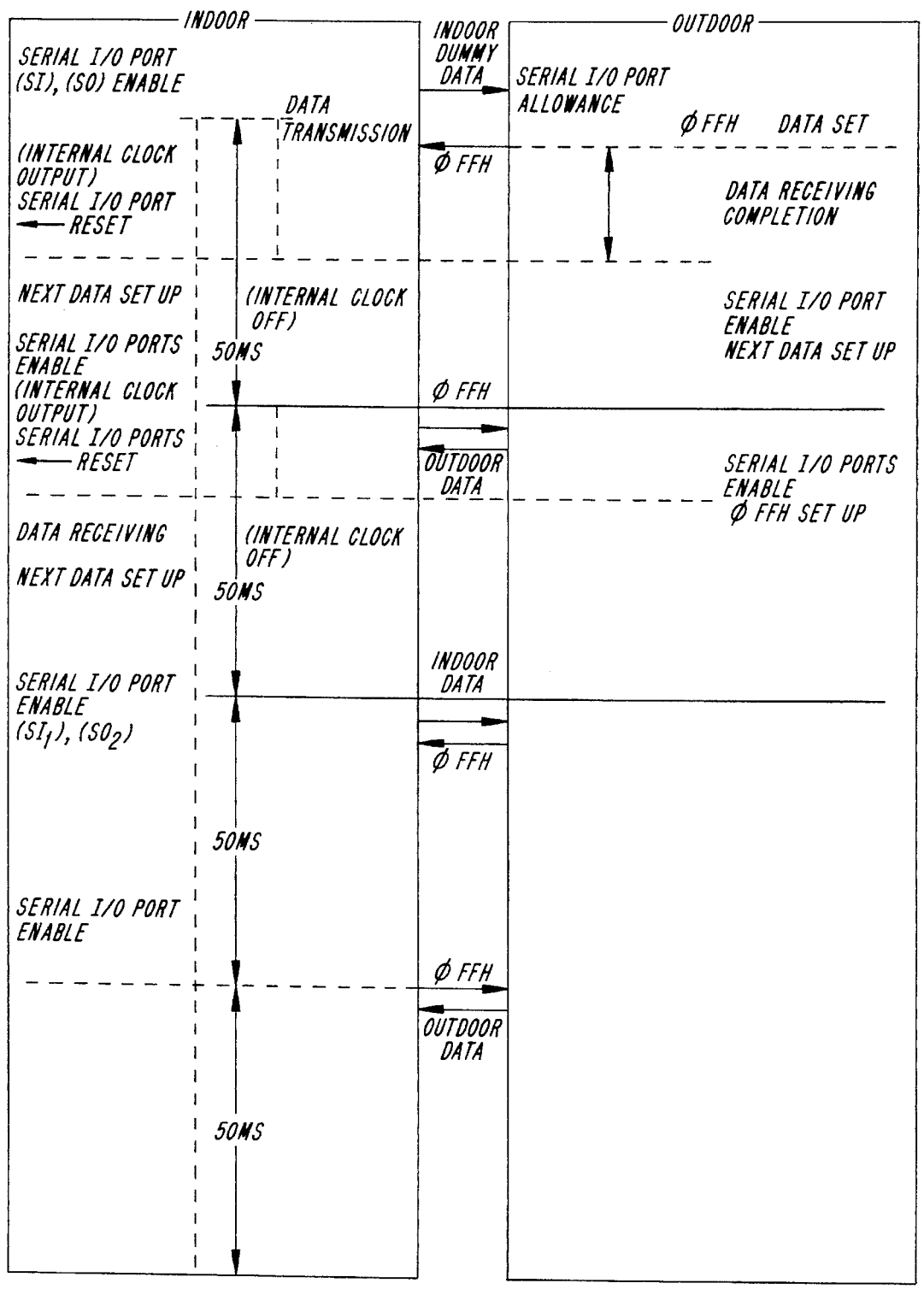

FIGS. 4A, 4B and 4C are flow charts illustrating the data transmission and reception procedures of the indoor unit, FIG. 5 is a flow chart illustrating the data transmission and reception procedures of the outdoor unit, and FIG. 6 is a block diagram illustrating the data transmission and reception procedures between the indoor and outdoor units.

First, referring to FIG. 4A, the indoor microprocessor 1 is reset to be initialized. At step 100, the transmission data (data1) is set at a serial buffer SB. Control then passes to step 200 to allow the performance of either an interrupt routine A or an interrupt routine B. Then, control jumps to step 400 to enable serial input/output ports SI1 and S02. Assuming that the interrupt routine A, as shown in FIG. 4B, is allowed at step 200, data (e.g., data1) from the indoor microprocessor 1 is input through the serial input port SI2 into the inner register of the outdoor microprocessor 2. At the same time, the outdoor dummy data previously stored in the outdoor microprocessor 2 is input through the serial input port SI1 into the inner register of the indoor microprocessor 1 as shown in FIG. 6. Thereafter, if the data transmission and reception exchange is completed, at step 201 the indoor microprocessor 1 resets its serial input/output ports SI1 and SO1 to be prohibited. Control then passes to step 202 to judge whether the current data value is that stored at the fourth table location, for example dummy data (OFFH). If the fourth table location is currently being evaluated, control passes from step 202 to step 203 to reset the data value X. If not the fourth table location, step 202 passes to step 204 to set X=X+1. Then, the data value stored at table location X+1 is stored in the indoor processor's memory. Step 204 moves to step 205 to judge whether the incremented table location is the first table location. If the data value is that stored in the first table location, such as data1, at step 206, the outdoor microprocessor data is stored in RAM of the indoor microprocessor's memory. If that stored in the first table location, step 205 moves onto step 207 to determine whether the data value is that stored in the third table location, step 207 passes to step 206 to store the data of the outdoor microprocessor 2 in the RAM of the indoor microprocessor. If not the first or third table location, step 207 jumps to step 208 to memorize a table value at the serial buffer SB of the outdoor microprocessor 2.

Next step 208 jumps to step 500 of FIG. 4A to store the transmission data in the table of the indoor microprocessor 1 so as to be ready for setting the next transmission data. The data value stored at the table is set as each of data1 at X=0, OFFH at X=1, data2 at X=2, and OFFH at X=3 to output each data at the time that the serial input/output ports SI1 and SO1 are again enabled.

Next, step 208 moves to step 209 to judge whether the received data group corresponds in its most significant bits (MSB) with the data values (data1) and (data2). In other words, at step 300, it is determined if the received data is effective data based on whether the received data group's most significant bits are equal with data1 (e.g., 0101 as data1) and data2 (e.g., 1101 as data2) and control then returns to the interrupt routine (step 200) to perform the next interrupt B routine.

Similarly, the outdoor microprocessor 2 performs the operation of the data transmission/receive like that of the indoor microprocessor 1. In other words, the outdoor microprocessor 2 is reset to be initialized at step 600. If the outdoor microprocessor 2 stores data (data1) at its serial buffer SB, step 600 is proceeded onto step 601 to memorize dummy data (OFFH) at the serial buffer SB. Step 601 is moved onto step 603 to make the serial input/output ports SI2 and S02 being enabled so as to send data to the indoor microprocessor 1 and receive data therefrom.

What is claimed is:

1. A system for data transmission/reception between microprocessors comprising:

a first microprocessor including means for generating synchronizing clock signals from an inner timer; judging means for determining whether most significant bits of data received during a data receiving mode corresponds to dummy data previously stored in a table in said first microprocessor; means for identifying a transmission or a reception state of said first microprocessor based upon a value of said dummy data; and means for determining whether data transmission/reception has been effective responsive to the judging means determination of whether the received data corresponds to the dummy data which signify a transmission or a reception state; and a second microprocessor including judging means for determining whether the most significant bits of data received during a data receiving mode corresponds to dummy data previously stored in a table in said second microprocessor, and means for determining if data transmission/reception has been effective responsive to the judging means determination of whether the most significant bits of the received data corresponds to the dummy data which signify a transmission of a reception state.

2. The system of claim 1 further comprising:

timer means, in said first microprocessors, for generating clock signals which are used to synchronize both said first and second microprocessors.

3. The system of claim 1 further comprising:

means for allowing one of said first and said second microprocessors to enter a transmission mode and the other of said first and second microprocessors to enter a reception mode based upon a value of said dummy data.

4. A control method for data transmission/reception between microprocessors comprising the steps of:

operating an inner timer of any one of the microprocessors to generate synchronizing clock signals for each of said microprocessors therefrom;

forcing the microprocessors to output dummy data previously stored in a table therein in order to be operated in one of a receiving mode and a transmitting mode;

judging whether most significant bits of any one of a plurality of received data groups received by any of the microprocessors in the receiving mode corresponds to the dummy data;

determining whether data transmission/reception was effective responsive to whether the most significant bits of any one of the received data groups corresponds to the dummy data which signify a transmission or a reception state; and entering, in each of said microprocessors, either a data transmission mode or a data reception mode based upon a value of said dummy data.

5. The control method for data transmission/reception between microprocessors as claimed in claim 4, wherein the step of judging is executed after an elapse of a predetermined time during the data transmission/reception.

6. The control method for data transmission/reception between microprocessors as claimed in claim 5, wherein the predetermined time is 5 seconds from switching to a data transmission mode or to a data reception mode.

7. A method for controlling data communication between a first and second processor comprising the steps of:

establishing a table of dummy data values which are stored in each of said first and second processors, at least one of said dummy data values signifying a data transmission mode and at least one of said dummy data values signifying a data reception mode;

transmitting first data, including said at least one of said dummy data values signifying said data transmission mode, from said first processor to said second processor;

transmitting second data, including said at least one of said dummy data values signifying said data reception mode, from said second processor to said first processor;

determining whether data transmission/reception was effective based on the dummy data values signifying the data transmission/reception mode; and operating on said first and second data based upon said respective dummy data values.

* * * * *